(12) United States Patent
Windbergs et al.

(10) Patent No.: US 9,695,759 B2
(45) Date of Patent: Jul. 4, 2017

(54) INJECTION DEVICE AND INTERNAL COMBUSTION ENGINE HAVING A HEATING DEVICE

(75) Inventors: Thor Windbergs, Tamm (DE); Andreas Gutscher, Markgroeningen (DE); Andreas Posselt, Muehlacker (DE); Marko Lorenz, Grossbottwar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 939 days.

(21) Appl. No.: 13/444,049

(22) Filed: Apr. 11, 2012

(65) Prior Publication Data

US 2012/0279472 A1 Nov. 8, 2012

(30) Foreign Application Priority Data

Apr. 13, 2011 (DE) .................. 10 2011 007 327

(51) Int. Cl.

| F02D 19/06 | (2006.01) |
|---|---|
| F02M 31/125 | (2006.01) |
| F02M 69/04 | (2006.01) |
| F02D 41/06 | (2006.01) |
| F02D 41/30 | (2006.01) |
| F02D 19/08 | (2006.01) |

(52) U.S. Cl.

CPC ....... *F02D 19/0692* (2013.01); *F02D 41/062* (2013.01); *F02D 41/3094* (2013.01); *F02M 31/125* (2013.01); *F02M 69/044* (2013.01); *F02D 19/0647* (2013.01); *F02D 19/084* (2013.01); *Y02T 10/126* (2013.01); *Y02T 10/36* (2013.01)

(58) Field of Classification Search

CPC ............. F02D 19/0647; F02D 19/0692; F02D 19/084; F02D 41/062; F02D 41/3094; F02D 41/40; F02D 41/403; F02D 41/405; F02M 31/125; F02M 69/044; F02M 31/02; F02M 31/04; Y02T 10/126; Y02T 10/36

USPC ..... 239/533.2, 135; 123/298, 445, 456, 472, 123/478, 549, 554, 555, 557, 299, 300, 123/304, 543, 575; 137/334, 336

See application file for complete search history.

(56) References Cited

U.S. PATENT DOCUMENTS

| 4,996,953 A * | 3/1991 | Buck .................... F01B 3/0035 123/48 D |
| 5,168,839 A * | 12/1992 | Hitomi et al. ........... 123/184.42 |
| 5,284,117 A * | 2/1994 | Akase ........................ 123/445 |
| 5,529,035 A * | 6/1996 | Hunt et al. .............. 123/179.15 |

(Continued)

FOREIGN PATENT DOCUMENTS

DE 2 158 117 5/1973

*Primary Examiner* — Erick Solis
*Assistant Examiner* — Carl Staubach
(74) *Attorney, Agent, or Firm* — Gerard Messina (57) ABSTRACT

An injection device for an internal combustion engine is proposed having at least one injection valve system for injecting fuel into an intake manifold of the internal combustion engine and at least one heating device for preheating fuel injected by the injection valve system, the injection valve system including a first injection valve for injecting fuel in the direction of a first inlet opening of a combustion chamber of the internal combustion engine and a separate, second injection valve for injecting fuel in the direction of a second inlet opening of the combustion chamber.

4 Claims, 4 Drawing Sheets

(56) References Cited

U.S. PATENT DOCUMENTS

| | | | | |
|---|---|---|---|---|
| 6,722,344 | B2* | 4/2004 | Ashida | F02B 17/00 |
| | | | | 123/308 |
| 7,669,585 | B2* | 3/2010 | Haag et al. | 123/456 |
| 7,942,136 | B2* | 5/2011 | Lepsch et al. | 123/549 |
| 8,027,777 | B2* | 9/2011 | Ichihara et al. | 701/103 |
| 8,047,182 | B2* | 11/2011 | Doherty | 123/456 |
| 8,281,766 | B2* | 10/2012 | Tomiita et al. | 123/432 |
| 8,936,010 | B2* | 1/2015 | Costa et al. | 123/557 |
| 2005/0126551 | A1* | 6/2005 | Mello et al. | 123/549 |
| 2007/0017483 | A1* | 1/2007 | Tahara et al. | 123/431 |
| 2007/0283927 | A1* | 12/2007 | Fukumoto et al. | 123/445 |
| 2009/0107473 | A1* | 4/2009 | Imoehl et al. | 123/549 |
| 2009/0133676 | A1* | 5/2009 | Lepsch et al. | 123/549 |
| 2009/0241904 | A1* | 10/2009 | Sugiyama et al. | 123/468 |
| 2009/0241915 | A1* | 10/2009 | Sales | F02D 41/0025 |
| | | | | 123/549 |
| 2009/0248275 | A1* | 10/2009 | Ichihara | F02D 29/02 |
| | | | | 701/103 |
| 2009/0277432 | A1* | 11/2009 | Hung | F02B 17/005 |
| | | | | 123/575 |

* cited by examiner

INJECTION DEVICE AND INTERNAL COMBUSTION ENGINE HAVING A HEATING DEVICE

RELATED APPLICATION INFORMATION

The present application claims priority to and the benefit of German patent application no. 10 2011 007 327.2, which was filed in Germany on Apr. 13, 2011, the disclosure of which is incorporated herein by reference.

FIELD OF THE INVENTION

The present invention is based on an injection device.

BACKGROUND INFORMATION

Such injection devices for injecting fuel for internal combustion engines are believed to be generally understood. For example, DE 2 158 117 A1 an internal combustion discusses a throttle regulation in which fuel is injected by an injection device into the intake manifold leading into a combustion chamber of the internal combustion engine, the fuel being heated by an electric fuel heater before the injection in order to improve the evaporation of the fuel after the injection. This is an Otto engine having intake manifold injection, operated with a fuel based on gasoline.

In addition, it is believed to be understood to operate internal combustion engines not only with fuels based on gasoline, but also, in addition or exclusively, to supply internal combustion engines with alternative fuels such as (bio)ethanol, compressed natural gas (CNG), or liquefied natural gas (LNG). However, significant cold start problems arise with the use of such fuels. In particular with the use of a fuel made up of 100% bioethanol, depending on the particular engine characteristics, significant starting difficulties can occur already below a temperature boundary of approximately 15° C., additionally forming high exhaust gas rates in the cold start phase.

SUMMARY OF THE INVENTION

The injection device according to the present invention and the internal combustion engine according to the present invention according to the coordinate claims have, in relation to the existing art, the advantage that the cold start capacity at lower temperatures is improved and exhaust gas emissions are reduced. This effect is achieved through a combination of the heating of the fuel before the injection, using the heating device, and the injection of the fuel via two separate injection valves. The use of two separate injection valves, the first and the second injection valve, promotes a homogenous and stable combustion of the injected fuel precisely in the start and warm-up phase, because each injection valve has to inject only a reduced throughput quantity of fuel.

This results in a lower spray density, i.e. the characteristic drop size, in particular the Sauter mean diameter, of the atomized fuel is advantageously reduced and the portion of evaporated fuel in the intake manifold is increased, achieving a faster and more stable complete combustion of the fuel mixture in the combustion chamber. The better complete combustion of the fuel mixture in the combustion chamber further enables a later ignition angle with the same uneven running, causing an increased temperature in the combustion chamber or in the exhaust tract. The cold start characteristics are thus already improved solely through the use of the two separate injection valves. Through a combination with the heating device, this effect can be increased severalfold, so that advantageously significantly increased cold start characteristics can be achieved even with the use of alternative fuels such as (bio)ethanol, compressed natural gas (CNG), or liquefied natural gas (LNG). In contrast to the existing art, the injection device according to the present invention therefore allows operation with alternative fuels without the occurrence of problems during cold starting resulting from the use of such fuels. The injection device according to the present invention may be provided or fashioned for the injection of ethanol, gasoline-ethanol mixtures, compressed natural gas (CNG), or liquefied natural gas (LNG). Due to having fewer impurities, ethanol or natural gas generally burn cleaner than gasoline and therefore produce less exhaust gas, so that the injection device according to the present invention permits a more environmentally friendly operation with reduced exhaust gas emissions compared to the existing art. The internal combustion engine according to the present invention may include an Otto engine having intake manifold injection for a motor vehicle, which may be an automobile. The internal combustion engine may have more than one cylinder.

Alternatively, however, the internal combustion engine according to the present invention may combine a plurality of fuel and/or injection systems with one another (for example so-called bi-fuel or flex-fuel systems). For example, the internal combustion engine according to the present invention may include an Otto engine having direct gasoline injection or a diesel engine having direct diesel injection, said engine additionally having intake manifold injection of the alternative fuels such as ethanol, gasoline-ethanol mixtures, compressed natural gas (CNG), or liquefied natural gas (LNG), using the injection device according to the present invention. Such a combination may be provided in particular in the area of commercial vehicles. The injection valve system may inject fuel in the context of a pre-positioned injection, which may particularly be combined with optimized spray targeting in order to achieve reduced emission of exhaust gas in the cold start phase. The heating device may include an electric heater in the form of an electric resistance wire.

Advantageous embodiments and developments of the present invention may be learned from the further descriptions herein, and from the description, with reference to the drawings.

According to a specific embodiment, it is provided that the first and second injection valve are capable of being controlled independently of one another, and/or the first and second injection valve are differently dimensioned in such a way that different quantities of fuel can be injected by the first and the second injection valve. Advantageously, the use of the two separate injection valves reduces the minimum quantity for each valve that can still be injected by the injection valves with a high degree of precision. At the same time, the on times for each of the injection valves are in this way made longer for the injection of the same quantity of fuel, so that a longer switch-on pulse is required for the injection of a small quantity of fuel. In this way, the precision of the injection process is significantly increased, and the danger that one of the injection valves will operate in a nonlinear range during injection of a very small quantity of fuel is removed. This effect is reinforced by the different dimensioning of the injection valves.

Advantageously, with the smaller-dimensioned injection valve a very small quantity of fuel can still be injected with a high degree of precision, while with the larger-dimensioned injection valve large quantities of fuel can nonetheless be injected in a short time. The metering range of the injection valve system is therefore significantly increased by the different dimensioning and by a separate controlling. Through a precise dosing of the injected fuel quantity, in addition a better and error-free complete combustion is achieved, in particular given rapid changes of load (in which the throttle valve for example opens abruptly, so that there is the danger of the air-fuel mixture becoming leaner), ensuring a reliable cold start phase and lower emission rates. Alternatively, the first and second injection valve may always be controlled in parallel.

According to a specific embodiment, it is provided that the heating device includes a first heating unit integrated in the first injection valve and/or a second heating unit integrated in the second injection valve. The first heating unit may be integrated in the first heating valve only, while the second injection valve does not have a second heating unit. Advantageously, in the cold start phase only the fuel injected by the first injection valve is heated by the heating device. On the one hand, this achieves a good cold start characteristic, while on the other hand the manufacturing costs are kept as low as possible, because only one injection valve with integrated heating unit is required.

Alternatively, both the first heating unit may be integrated in the first injection valve and the second heating unit is integrated in the second injection valve. In this way, the cold start characteristic can be further increased, because both the fuel injected by the first injection valve and the fuel injected by the second injection valve are heated by the heating device. The first and second heating unit are in particular capable of being controlled separately from one another, and are activated in the cold start and warm-up phase in particular only given low outside temperatures.

According to a specific embodiment, it is provided that the heating device is situated in a central fuel supply line for the first and second injection valve. In this way, only a single heating unit is required, by which both the fuel injected by the first injection valve and the fuel injected by the second injection valve are heated. In this way, a comparatively economical injection device is achieved. The central fuel supply line may supply additional first and additional second injection valves with fuel, in particular heated fuel, these additional valves being situated in intake manifolds of additional cylinders of the internal combustion engine. The fuel supply line includes in particular a fuel rail with or without return line, made for example of steel, aluminum, or plastic.

According to a specific embodiment, it is provided that the heating device is situated in a side channel of the fuel supply line, this side channel being provided in order to supply the first and/or second injection valve with fuel from the fuel supply line, a first heating unit of the heating device may be situated in a first side channel for supplying the first injection valve and/or a second heating unit of the heating device may be situated in a second side channel for supplying the second injection valve. The heating device may be situated in a side channel of the fuel supply line that supplies both the first and the second injection valve with fuel from the fuel supply line. Advantageously, in this way only a single heating unit is required that heats both the fuel injected by the first injection valve and the fuel injected by the second injection valve.

Alternatively, a first heating device may be situated only in the first side channel, which is provided exclusively for supplying the first injection valve, while the second injection valve is supplied via the second side channel with fuel from the fuel supply line, which does not have a heating device. This has the result that only the fuel injected by the first injection valve is heated. During the cold start phase, fuel may be injected only by the first injection valve. Alternatively, the first injection valve may inject heated fuel and the second injection valve injects fuel that is not heated. Alternatively, both a first heating apparatus may be situated in the first side channel, which is provided exclusively for supplying the first injection valve with fuel supplied from the fuel supply line, and also a second heating apparatus may be situated in the second side channel, which is provided exclusively for supplying the second injection valve with fuel supplied from the fuel supply line. The first and second heating apparatus may be capable of being controlled separately from one another.

According to a specific embodiment, it is provided that the injection device has a further injection valve system that has a third injection valve for injecting fuel in the direction of the first inlet opening and a separate fourth injection valve for injecting fuel in the direction of the second inlet opening, the third and the fourth injection valve may be capable of being controlled independently of one another, and/or the third and fourth injection valve may be differently dimensioned such that different quantities of fuel can be injected by the third and the fourth injection valve. The use of the additional injection valve system advantageously results in a higher heat input into the fuel per cylinder, so that the cold start characteristics are further improved. In addition, a better dynamic characteristic is achieved when there are transient changes in quantity, as well as a better engine throughput after the start phase, in the post-start and warm-up phase. The third and fourth injection valve may be provided or fashioned for the injection of gasoline, ethanol, gasoline-ethanol mixtures, compressed natural gas (CNG), or liquefied natural gas (LNG. The first and second injection valve system may each inject fuel having essentially the same composition.

Alternatively, however, fuels having different compositions could be injected by the first and second injection valve systems. For example, the first injection valve system injects a first fuel composition based on ethanol or a gasoline-ethanol mixture, while the second injection valve system injects a second fuel composition based on compressed gas, in particular natural gas (CNG, compressed natural gas), or liquefied gas (LNG, liquefied natural gas). The fuel injected by the second injection valve system may be not heated by a heating device, so that, particularly, only fuel injected by the first injection valve system may be used in the cold start and warm-up phase.

According to a specific embodiment, it is provided that the injection device has a further heating device for preheating fuel injected by the additional injection valve system, the additional heating device may include a third heating unit integrated in the third injection valve and/or a fourth heating unit integrated in the fourth injection valve. Advantageously, the fuel injected by the second injection system is thus also completely or partly heated.

According to a specific embodiment, it is provided that the further heating device is situated in a central further fuel supply line for the third and fourth injection valve. It may be provided that the further heating device is situated in a further side channel of the further fuel supply line, said further channel being provided in order to supply the third and/or the fourth injection valve with fuel from the further fuel supply line, a further first heating unit of the further heating device may be situated in a further first side channel for supplying the third injection valve, and/or a further second heating unit of the further heating device being situated in a further second side channel for supplying the fourth injection valve. The second injection valve system may thus be constructed essentially analogously to the first injection valve system, so that either only the fuel (in particular the second fuel composition) injected by the third injection valve or the fuel (in particular the second fuel composition) injected both by the third and by the fourth injection valve is heated.

A further subject matter of the present invention is an internal combustion engine having an injection device according to the present invention.

Exemplary embodiments of the present invention are presented in the drawings and are explained in more detail in the following description.

DETAILED DESCRIPTION

In the various Figures, identical parts have always been provided with the same reference characters, and are therefore as a rule each only named or mentioned once.

Figure 1:
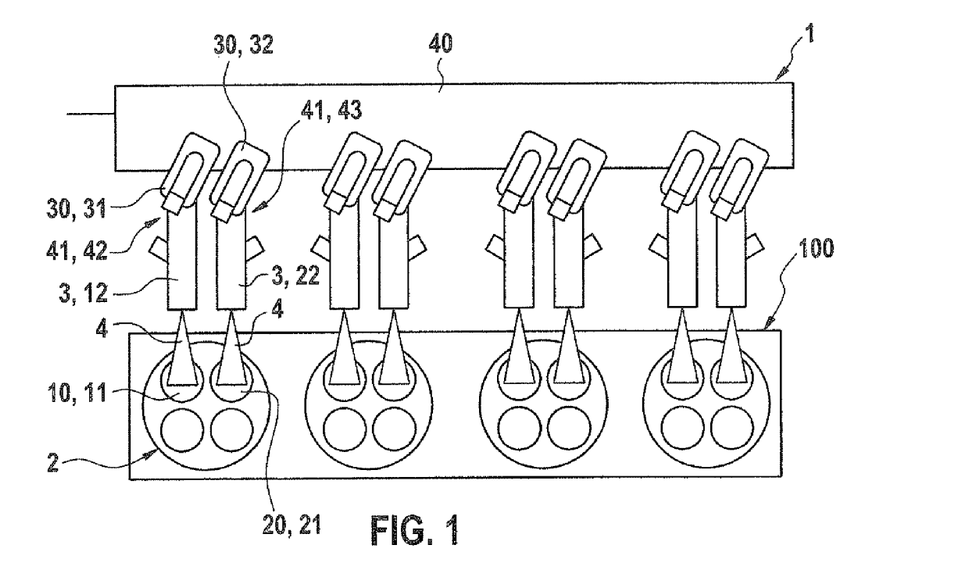
FIG. 1 shows a schematic view of an injection device and of an internal combustion engine according to a first specific embodiment of the present invention.

FIG. 1 shows a schematic view of an injection device 1 and of an internal combustion engine 100 according to a first specific embodiment of the present invention, the depicted internal combustion engine 100 having, as an example, four cylinders. Each of the four cylinders includes a combustion chamber 2 in which a piston moves. The wall of each combustion chamber 2 has a respective first inlet opening 10 and second inlet opening 20 through which an air-fuel mixture is suctioned into combustion chamber 2. Each combustion chamber 2 has, in addition, outlet openings through which the raw exhaust gases of the combusted air-fuel mixture are ejected from combustion chambers 2. Each of the cylinders has in addition a first inlet valve 11 that is provided in order to close respective first inlet opening 10, and a second inlet valve 21 provided in order to close second inlet opening 20.

For each cylinder, injection device 1' has an injection valve system 3 for injecting fuel 4 into the respective combustion chamber 2. Each injection valve system 3 has both a first injection valve 12 for injecting fuel 4 in the form of a spray cone in the direction of first inlet opening 10, and a separate second injection valve 22 for injecting fuel 4 in the form of a spray cone in the direction of second inlet opening 20, so that a flammable air-fuel mixture forms in combustion chamber 2. As fuel 4, which may be ethanol, a gasoline-ethanol mixture, compressed natural gas (CNG), or liquefied natural gas (LNG) is injected by injection valve system 3. First and second injection valves 12, 22 are supplied with this fuel 4 by a central fuel supply line 40, fuel 4 being conducted from fuel supply line 40 to first and second injection valve 12, 22 via side channels 41. Side channels 41 each include first and second side channels 42, 43. First side channel 42 transports fuel 4 to respective first injection valve 12, while second side channel 43 transports fuel 4 to respective second injection valve 22.

Injection device 1 has in addition a heating device 30 that includes a respective first heating unit 31 integrated in each of first side channels 42 and second heating unit 32 integrated in each of second side channels 43. First heating unit 31 heats the fuel 4 that is to be injected from each first injection valve 12, while second heating unit 32 pre-heats fuel 4 that is to be injected from each second injection valve 22. First and second injection valves 12, 22 of a cylinder may be capable of being controlled separately from one another, fuel 4 being in particular injected by first and second injection valve 12, 22 once each per combustion cycle. Here, a pre-positioned injection may take place in order in order to prevent, in particular during cold starting, the formation of a fuel film on the wall of the cylinder opposite inlet openings 10, 20, thus achieving a reduction of raw exhaust gases. In addition to the pre-positioned injection, in combination with optimal spray targeting the hydrocarbon emissions during cold start can be further reduced. The injected fuel jet is for this purpose oriented in the direction of the floor of the channel of the respective intake manifold, so that the suctioned air-fuel mixture is deflected in the direction of the center of the combustion chamber, thus preventing a wetting of the wall of the cylinder opposite first and second inlet openings 10, 20. At the same time, a wetting of the channel floor and thus a wall film formation is achieved in the intake manifold.

Through the use of two separate injection valves, first and second injection valve 12, 22, the reduction of the Sauter mean diameter achieves a stable complete combustion and thus hotter complete combustion of the injected fuel 4. In combination with heating device 30, the cold start characteristics of internal combustion engine 100 are thus significantly improved. First and second injection valve 12, 22 may have different dimensions, such that different quantities of fuel 4 can be injected by first and second injection valve 12, 22. Heating device 30 may include an electric heater in the form of an electric resistance wire.

Figure 2:
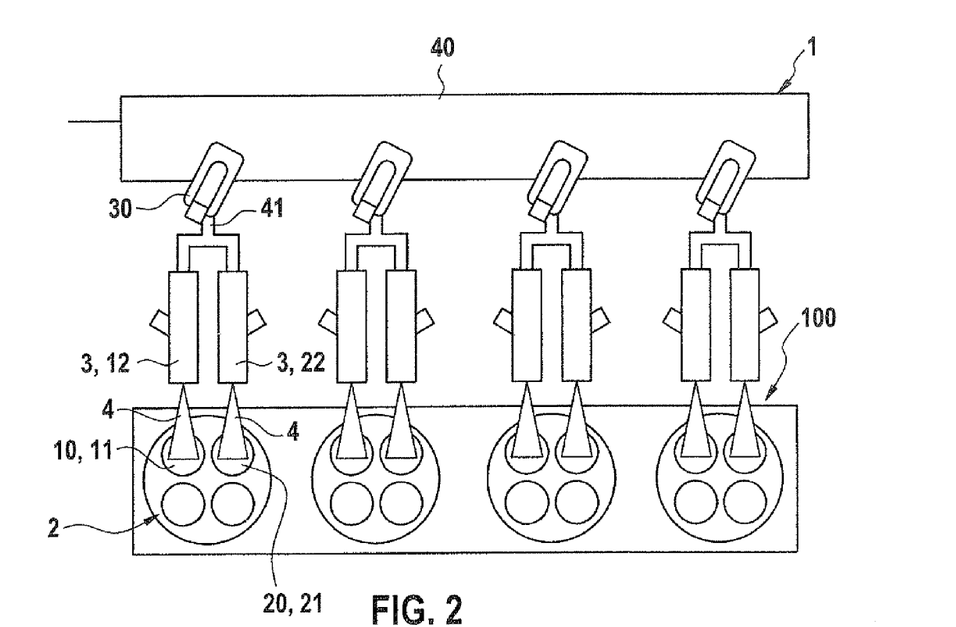
FIG. 2 shows a schematic view of an injection device and of an internal combustion engine according to a second specific embodiment of the present invention.

FIG. 2 shows a schematic view of an injection device 1 and of an internal combustion engine 100 according to a second specific embodiment of the present invention, the second specific embodiment essentially resembling the first specific embodiment illustrated in FIG. 1, first and second injection valve 12, 22 in injection device 1 of the second specific embodiment each being supplied with fuel 4 from fuel supply line 40 through a common side channel 41. Heating device 30 thus has only a single heating unit for each cylinder, said unit being situated in this common side channel 41 and pre-heating both fuel 4 that is to be injected from first injection valve 12 and fuel 4 to be injected from second injection valve 22

Figure 3:
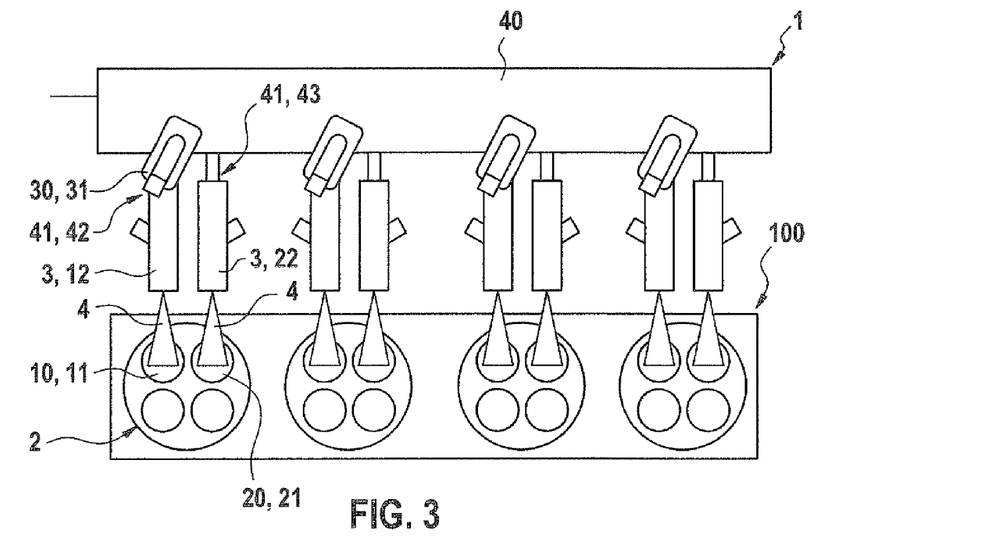
FIG. 3 shows a schematic view of an injection device and of an internal combustion engine according to a third specific embodiment of the present invention.

FIG. 3 shows a schematic view of an injection device 1 and of an internal combustion engine 100 according to a third specific embodiment of the present invention, the third specific embodiment essentially resembling the first specific embodiment illustrated in FIG. 1, but only a first heating unit 31 being situated in first side channel 42, while no heating unit is provided in second side channel 43. In this way, heating device 30 pre-heats only the fuel 4 that is to be injected from first injection valve 12, while the fuel 4 to be injected from second injection valve 22 is not pre-heated.

Figure 4:
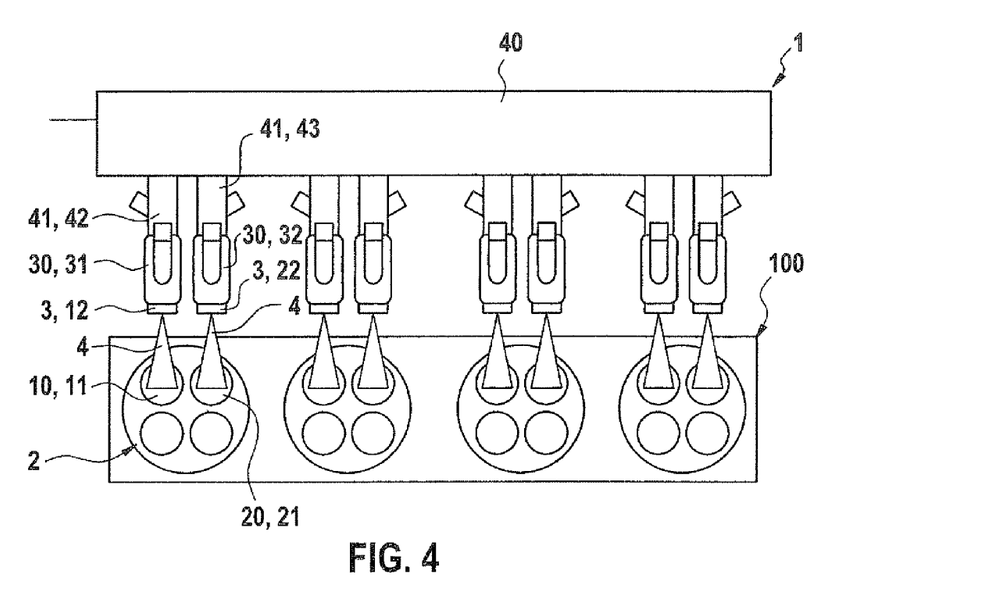
FIG. 4 shows a schematic view of an injection device and of an internal combustion engine according to a fourth specific embodiment of the present invention.

FIG. 4 shows a schematic view of an injection device 1 and of an internal combustion engine 100 according to a fourth specific embodiment of the present invention, the fourth specific embodiment essentially resembling the first specific embodiment illustrated in FIG. 1, first heating unit 31 not being integrated in first side channel 42 but rather being integrated directly in first injection valve 12, and second heating unit 32 not being integrated in second side channel 43, but rather being integrated directly in second injection valve 22.

Figure 5:
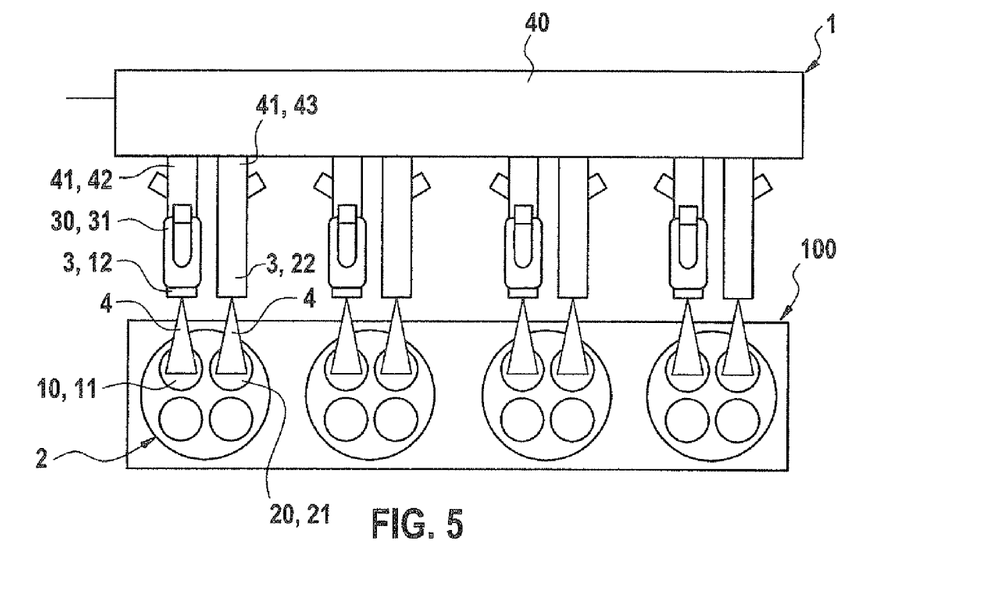
FIG. 5 shows a schematic view of an injection device and of an internal combustion engine according to a fifth specific embodiment of the present invention.

FIG. 5 shows a schematic view of an injection device 1 and of an internal combustion engine 100 according to a fifth specific embodiment of the present invention, the fifth specific embodiment essentially resembling the fourth specific embodiment illustrated in FIG. 4, but only a first heating unit 31 being integrated in each first injection valve 12, while no heating unit is integrated in second injection valve 22. In this way, heating device 30 pre-heats only fuel 4 to be injected from first injection valve 12, while fuel 4 to be injected from second injection valve 22 is not pre-heated.

Figure 6:
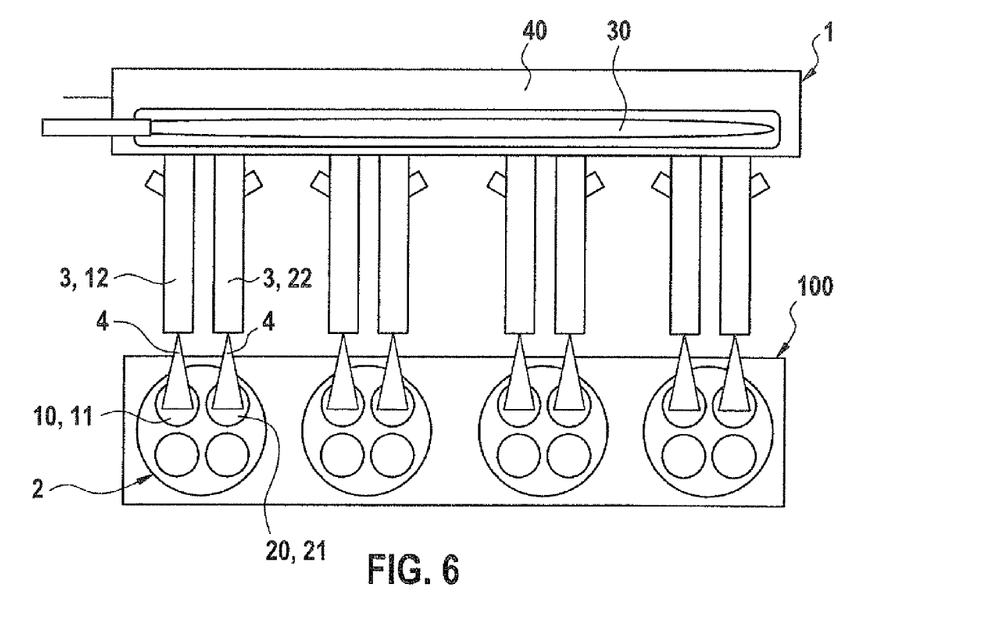
FIG. 6 shows a schematic view of an injection device and of an internal combustion engine according to a sixth specific embodiment of the present invention.

FIG. 6 shows a schematic view of an injection device 1 and of an internal combustion engine 100 according to a sixth specific embodiment of the present invention, the sixth specific embodiment essentially resembling the fifth specific embodiment illustrated in FIG. 5, injection device 1 having only one heating device 30, which is integrated in fuel supply line 40. In this way, fuel 4 injected by all first and second injection valves 12, 22 is pre-heated by the only one heating device 30.

Figure 7:
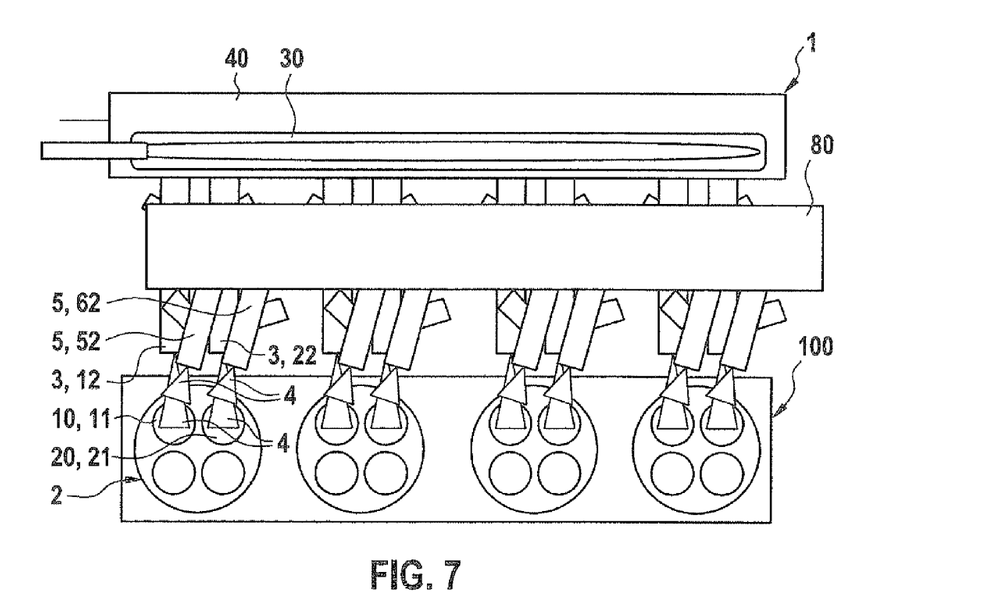
FIG. 7 shows a schematic view of an injection device and of an internal combustion engine according to a seventh specific embodiment of the present invention.

FIG. 7 shows a schematic view of an injection device 1 and of an internal combustion engine 100 according to a seventh specific embodiment of the present invention, the seventh specific embodiment essentially resembling the sixth specific embodiment illustrated in FIG. 6, injection device 1 having a further injection valve system 5 for each cylinder. Further injection valve system 5 includes a third injection valve 52 for injecting fuel 4 in the direction of first inlet opening 10 and a separate, fourth injection valve 62 for injecting fuel 4 in the direction of second inlet opening 20. Third and fourth injection valve 52, 62 are supplied with fuel 4 via a central further fuel supply line 80. Further injection valve system 5 may be situated in the intake manifold so as to be offset relative to injection valve system 3. In addition, injection valve system 3 may be used to inject a fuel 4 having a first fuel composition, and that further injection valve system 5 is used to inject a fuel 4 having a second fuel composition differing from the first fuel composition. For example, first injection valve system 3 injects fuel 4 having a first fuel composition based on ethanol, or a gasoline-ethanol mixture, while second injection valve system 5 injects fuel 4 having a second fuel composition based on compressed gas, in particular natural gas (CNG) or liquefied natural gas (LNG). However, injection valve system 3 and further injection valve system 5 may each inject fuel 4 having essentially the same composition. Third and fourth injection valve 52, 62 may be capable of being controlled separately from one another and/or are fashioned for a different throughput of fuel 4. The spray cones of injection valve system 3 may have a different cone opening and/or a different spray width than the spray cones of further injection system 5. In the seventh exemplary embodiment, fuel 4 injected by further injection valve system 5 is not pre-heated by a heating device.

Figure 8:
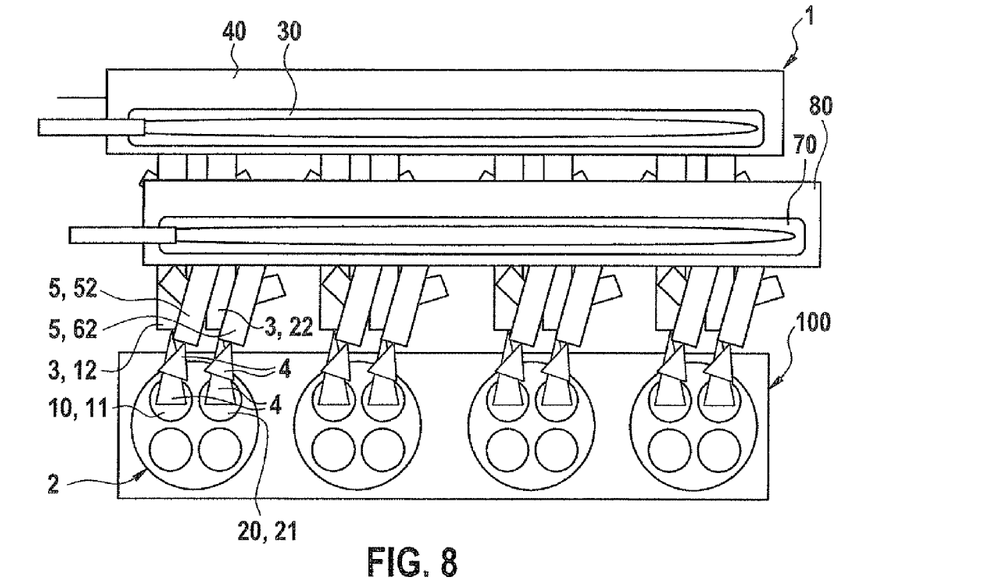
FIG. 8 shows a schematic view of an injection device and of an internal combustion engine according to an eighth specific embodiment of the present invention.

FIG. 8 shows a schematic view of an injection device 1 and of an internal combustion engine 100 according to an eighth specific embodiment of the present invention, the eighth specific embodiment essentially resembling the seventh specific embodiment illustrated in FIG. 7, injection device 1 having a further heating device 70 provided for the pre-heating of fuel 4 injected by further injection valve system 5 and in particular by all third and fourth injection valves 52, 62. For this purpose, further heating device 70 is situated in further fuel supply line 80.

Alternatively, further heating device 70 may be configured analogously to heating device 30 shown in FIGS. 1 through 5, so that further heating device 70 is integrated in a common further side channel for the common supplying of third and fourth injection valve 52, 62 with fuel 4 from further fuel supply line 80, or that a further first heating apparatus of further heating device 70 is integrated in a further first side channel for supplying third injection valve 52 with fuel 4 from further fuel supply line 80, or that both a further first heating apparatus of further heating device 70 is integrated in a further first side channel for supplying third injection valve 52 with fuel 4 from further fuel supply line 80 and a further second heating apparatus of further heating device 70 is integrated in a further second side channel for supplying fourth injection valve 62 with fuel 4 from further fuel supply line 80, or that the further first heating apparatus is integrated in third injection valve 52, or that both the further first heating apparatus is integrated in third injection valve 52 and the further second heating apparatus is integrated in fourth injection valve 62. Further heating device 70 may also include an electric heater in the form of an electric resistance wire.

What is claimed is:

1. An injection device for an internal combustion engine, comprising:
   at least one injection valve system for injecting fuel into an intake manifold of the internal combustion engine and including a first injection valve, a second injection valve, and a third injection valve;
   a central fuel supply line supplying fuel at least to the first, second, and the third injection valves; and
   only one heating device situated in the central fuel supply line for pre-heating the fuel before the fuel is injected, the single heating device being common to and supplying heat to all injection valves connected to the central fuel supply line;
   wherein the first injection valve injects the fuel in the direction of a first inlet opening of a first cylinder of a combustion chamber of the internal combustion engine, the second injection valve injects the fuel in the direction of a second inlet opening of the first cylinder, and the third injection valve injects fuel in the direction of a first inlet opening of a second cylinder,
   wherein the at least one injection valve system includes a fourth injection valve for injecting the fuel in the direction of the first inlet opening of the first cylinder,
   wherein the first injection valve and the fourth injection valve are controllable independently of one another such that different quantities of fuel may be injected by the first and the fourth injection valves; and a central further fuel supply line supplying fuel at least to the fourth injection valve, wherein a further heating device is situated in the central further fuel supply line for pre-heating fuel before the fuel is injected.

2. An injection device for an internal combustion engine, comprising:

at least one injection valve system for injecting fuel into an intake manifold of the internal combustion engine and including a first injection valve, a second injection valve, and a third injection valve;

a central fuel supply line supplying fuel at least to the first, second, and the third injection valves; and only one heating device situated in the central fuel supply line for pre-heating the fuel before the fuel is injected, the single heating device being common to and supplying heat to all injection valves connected to the central fuel supply line;

wherein the first injection valve injects the fuel in the direction of a first inlet opening of a first cylinder of a combustion chamber of the internal combustion engine, the second injection valve injects the fuel in the direction of a second inlet opening of the first cylinder, and the third injection valve injects fuel in the direction of a first inlet opening of a second cylinder, wherein the at least one injection valve system includes a fourth injection valve for injecting the fuel in the direction of the first inlet opening of the first cylinder, wherein the first injection valve and the fourth injection valve are controllable independently of one another such that different quantities of fuel may be injected by the first and the fourth injection valves, wherein the at least one injection valve system includes a fifth injection valve for injecting fuel in the direction of the second inlet opening of the first cylinder, and wherein the second and the fifth injection valves are controllable independently of one another, and the second injection valve and the fifth injection valve are dimensioned differently from one another such that different quantities of fuel may be injected by the second injection valve and the fifth injection valve.

3. An internal combustion engine, comprising:

an injection device including:

at least one injection valve system for injecting fuel into an intake manifold of the internal combustion engine and including a first injection valve, a second injection valve, and a third injection valve;

a central fuel supply line supplying fuel at least to the first, second, and the third injection valves; and only one heating device situated in the central fuel supply line e for pre-heating the fuel before the fuel is injected, the single heating device being common to and supplying heat to all injection valves connected to the central fuel supply line;

wherein the first injection valve injects the fuel in the direction of a first inlet opening of a first cylinder of a combustion chamber of the internal combustion engine, the second injection valve injects the fuel in the direction of a second inlet opening of the first cylinder, and the third injection valve injects fuel in the direction of a first inlet opening of a second cylinder, wherein the at least one injection valve system includes a fourth injection valve for injecting the fuel in the direction of the first inlet opening of the first cylinder, wherein the first injection valve and the fourth injection valve are controllable independently of one another such that different quantities of fuel may be injected by the first and the fourth injection valves; and a central further fuel supply line supplying fuel at least to the fourth injection valve, wherein a further heating device is situated in the central further fuel supply line for pre-heating fuel before the fuel is injected.

4. The injection device of claim 1, wherein the first injection valve and the fourth injection valve are dimensioned differently from one another such that different quantities of fuel may be injected by the first and fourth injection valves.

* * * * *